United States Patent [19]

Farnelli

[11] Patent Number: 5,314,625
[45] Date of Patent: May 24, 1994

[54] EXTERNAL OIL PAN MAGNET

[76] Inventor: Michael Farnelli, 18050 Kelly Blvd., Dallas, Tex. 75287

[21] Appl. No.: 998,411

[22] Filed: Dec. 29, 1992

[51] Int. Cl.$^5$ .............................................. B01D 35/06
[52] U.S. Cl. .................... 210/695; 210/222; 184/6.25; 335/304; 335/305
[58] Field of Search ............... 210/222, 695; 184/6.25; 335/304, 305, 302; 206/818

[56] References Cited

U.S. PATENT DOCUMENTS

| | | | |
|---|---|---|---|
| 2,613,246 | 10/1952 | Spodig | 175/21 |
| 2,622,699 | 12/1952 | Mills | 184/13 |
| 2,635,754 | 4/1953 | Stem | 210/1.5 |
| 2,657,342 | 10/1953 | Stem | 335/305 |
| 3,331,043 | 7/1967 | Orzabal | 335/285 |
| 3,419,832 | 12/1968 | Baermann | 206/818 |
| 3,480,145 | 11/1969 | Gladden | 210/223 |
| 3,985,649 | 10/1976 | Eddelman | 210/695 |
| 4,401,960 | 8/1983 | Uchikune et al. | 335/304 |
| 4,711,271 | 12/1987 | Weisenbarger et al. | 137/827 |
| 4,773,995 | 9/1988 | Kondo | 210/222 |
| 4,839,044 | 6/1989 | Tomita | 210/222 |
| 4,857,188 | 8/1989 | Aisa et al. | 210/222 |
| 4,894,153 | 1/1990 | Shirdavani | 210/222 |
| 4,946,590 | 8/1990 | Hertzog | 210/222 |
| 4,956,084 | 9/1990 | Stevens | 210/222 |
| 4,995,971 | 2/1991 | Droste et al. | 210/168 |
| 5,078,871 | 1/1992 | McCready | 210/222 |

FOREIGN PATENT DOCUMENTS 3532225 12/1968 Japan .

Primary Examiner—Matthew O. Savage
Attorney, Agent, or Firm—Hubbard, Tucker & Harris

[57] ABSTRACT

The external oil pan magnet (10) is placed on the external surface of the oil pan (2) where it attracts and captures metallic particles suspended in a motor's oil supply. In a first embodiment, the external oil pan magnet (10) is comprised of magnet (12) coupled to a channeled shield (14). The shield (14) leaves at least one surface of the magnet exposed and amplifies the magnetic force of the magnet. The exposed surface magnetically attaches to the external surface of the oil pan (2). After the oil is drained during normal maintenance, the operator slides the magnet assembly across the bottom of the pan and over the oil pan plug hole. Metallic debris is evacuated through the oil pan plug hole. The plug is replaced and the oil supply replenished. In a second embodiment, the magnet assembly is configured to encircle the oil pan plug. The magnet temporarily magnetizes the plug which attracts metallic debris from the oil.

3 Claims, 1 Drawing Sheet

EXTERNAL OIL PAN MAGNET

BACKGROUND OF THE INVENTION

In an internal combustion engine, a piston reciprocates within a cylinder. An air/fuel mixture above the piston is ignited, driving it down. The sequential firing of the pistons produces the power used to propel a vehicle. Both the piston and cylinder are typically made from a metal such as steel. The friction between the piston and cylinder is diminished by a lubricant such as oil. The oil circulates between a reservoir, the oil pan, and the engine.

In addition to lubricating the engine parts, the oil also conveys heat and debris from the engine. This debris can include fine metal shavings from the reciprocating engine parts. The oil circulates this debris into the oil pan and then back into the engine. An oil filter is typically used in the circulation path to filter larger particulate matter from the oil. However, the filter fails to remove all the metal filings from the circulating oil. The remaining metal shavings continue to cause excessive wear on the engine parts. Therefore, a need exists for a method of filtering the metal filings which supplements the oil filter.

One solution is to place a magnet into the oil pan to attract the filings from the oil and permanently capture them at the bottom of the oil pan. For example, U.S. Pat. No. 4,773,995 to Kondo, entitled "Magnet Filter," discloses a planar permanent magnet for use in a gear box, an oil reservoir, or the like. The magnet is partially wrapped by a magnetically permeable plate made of a magnetic metal. Opposite ends of the plate extend across the upper and lower edge portions of the permanent magnet piece. A sheet spring piece with flexed pieces at the opposite end portions is bent transversely of the sheet into an S-shape. When the magnet filter is fitted in a recessed portion of a gear case or the like, the free ends of the flexed portions at the opposite side ends of the sheet spring piece will bite into the inner peripheral wall of the recessed portion and prevent the filter from slipping out of the recessed portion.

If the device described in Kondo ('995) fails, the device can dislodge and damage adjacent parts. Additionally, since the device is placed in the oil pan, it is difficult to remove, clean and replace. Therefore, a need exists for a device that attaches easily to a car's oil pan and yet effectively filters any metal filings or particles from the oil. The device should exert enough magnetic force to draw the particles through even the thickest oil. Moreover, the device should allow the captured particles to be easily withdrawn through the oil plug hole during normal servicing. The device should also be usable with any wet sump oil pump that uses an oil reservoir. Therefore, the device should be usable by automobiles, farm equipment, trucks, compressors, and the like.

SUMMARY OF THE INVENTION

The present invention relates to an oil pan magnet which is mounted to the external surface of the oil pan. It attracts and captures metallic particles suspended in a motor's oil supply. In a first embodiment, the external oil pan magnet is comprised of magnet coupled to a channeled shield. The shield leaves at least one surface of the magnet exposed and amplifies the magnetic force of the magnet. The exposed surface magnetically attaches to the external surface of the oil pan. If the oil pan is made of a non-magnetic material, such as fiberglass, the shield can have flange portions which can be attached to the oil pan by non-magnetic means.

In use, the oil pan magnet, or magnet assembly, is simply placed on the bottom of the oil pan. Its magnetic attraction to the plan holds it securely in place. Any metallic debris in the oil is attracted to the internal surface of the pan adjacent to the magnet assembly. After the oil is drained during normal maintenance, the operator slides the magnet assembly across the bottom of the pan, thus dragging the captured debris across the interior surface of the pan with it. The operator then slides the magnet assembly over the oil pan plug hole. Metallic debris is evacuated through the oil pan plug hole. The plug is replaced and the oil supply replenished.

In a second embodiment, the magnet assembly is configured to encircle the oil pan plug. The magnet temporarily magnetizes the plug which attracts metallic debris from the oil. During a normal oil change, the metallic debris attached to the plug is removed along with the plug. Thus, the oil pan magnet acts to evacuate the debris from the pan. Likewise, the first embodiment can be modified with an adapter plate which has a central hole dimensioned to engage the oil pan plug. The adapter plate is added before the oil pan plug is removed.

The present oil pan magnet is not placed inside the oil pan like the device described in Kondo ('995). Therefore, the device cannot dislodge and damage adjacent parts. Additionally, since the device is placed on the outside of the oil pan, it is easy to remove, clean and replace. The present invention uses a metal shield which directs and amplifies the natural magnetic force of the magnet. Therefore, the device exerts enough magnetic force to draw the particles through even the thickest oil. Moreover, the ability to attach the device over the oil pan plug hole allows the captured particles to be easily evacuated through the oil pan plug hole during normal servicing. A method of removing metal filings suspended in a fluid in an oil pan consists of coupling the invention to the external surface of the oil pan, then removing the fluid from the pan through a sealable hole. The magnet assembly is then slid across the oil pan to the hole, where the metal filings attracted to the magnet may be removed through the hole.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE DRAWINGS

Figure 1:
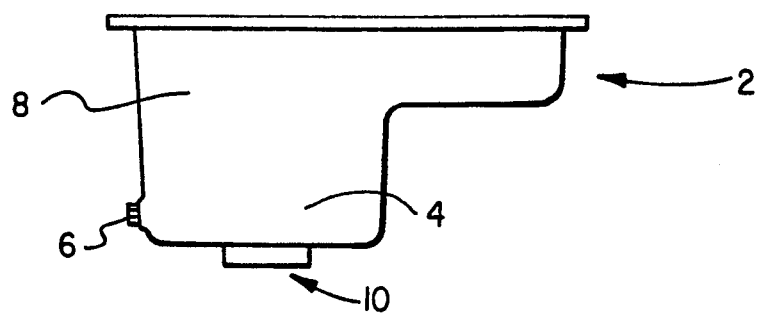
FIG. 1 is a perspective view of a first embodiment of the external oil pan magnet attached to an oil pan.

The present invention relates to an externally mounted magnet for use removing metal shavings suspended in a circulatory fluid such as oil. Referring to FIG. 1, an external oil pan magnet 10 which embodies the invention is shown attached to the external surface of an oil pan 2. The pan contains an amount of oil 4. The oil 4 contains a plurality of metal filings and particles 8 introduced to the oil by the normal use of the engine. The oil pan 2 has an oil plug 6 which seals an oil plug hole used for draining oil from the pan.

Figure 2:
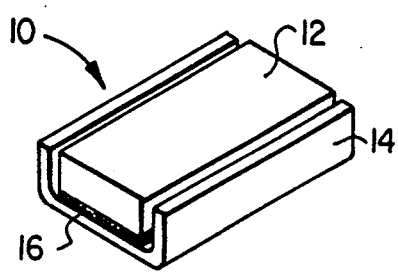
FIG. 2 is a perspective view of the first embodiment of the external oil pan magnet.

Referring to FIG. 2, the oil pan magnet 10 is comprised of a rectangular magnet 12 partially surrounded by a U-shaped shield 14. The magnet includes first and second pole surfaces 12a, 12b, first and second sides 12c, 12d, and first and second ends 12e, 12f. A first pole surface 12a of the magnet 12 can be attached to the base 14a of the shield by an adhesive 16. In a preferred embodiment, the magnet is a ceramic magnet with the formula $MO\text{-}6Fe_2O_3$ wherein MO represents one or more of the metals chosen from the group Barium, Strontium, or Lead. Such a magnet, also known as a Ceramic 5 magnet has a residual flux density of approximately 3800 gauss and a coercive force of approximately 2400 oersteds. The adhesive 16 is typically Pliobond 20 by Ashland Chemical Co. of Columbus, Ohio. Pliobond 20 has a boiling point of approximately 760 degrees Fahrenheit, far in excess of expected engine temperatures which range between 270 and 300 degrees Fahrenheit.

The shield acts to redirect the lines of magnetic flux around each pole of the magnet. This has the effect of greatly increasing the magnetic strength of the magnet. The shield is normally made of 14 gauge cold rolled steel. The legs 14a, 14b of the shield are dimensioned to rise beyond the second pole surface 12b or the depth of the magnet by between 1/16 and ⅛ inches adjacent sides 12c and 12d, respectively. This ridge protects the surface of the ceramic magnet from damage. In one embodiment of the magnet assembly for use with a car, the magnet 12 is approximately 2 inches in length, 1¼ inches in width, and ⅜ inches in thickness. The shield is approximately 3 inches in length, 1½ inches in width and ⅝ inches in depth. Each pole of the magnet has between 30 to 35 pounds of pull. Therefore, the whole magnet has a holding force between 50 and 70 pounds. Of course, the magnet assembly can be sized to match the need. For larger oil pans, the size and strength of the magnet assembly could be increased.

Figure 3:
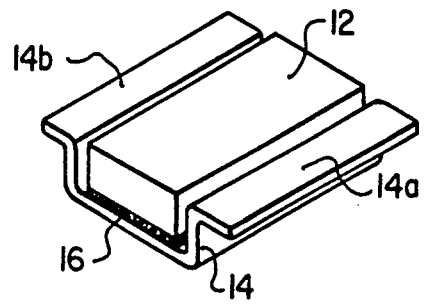
FIG. 3 is a perspective view of a second embodiment of the external oil pan magnet which includes a flanged shield.

Referring to FIG. 3, an alternate shield 14 is shown having flange portions 14a and 14b for use with oil pans made of nonmetallic materials. Each flange can extend out from the sides of the shield by an appropriate distance. To attach the magnet assembly, the flange portions are attached by any suitable attachment means such as glue or screws.

Figure 4:
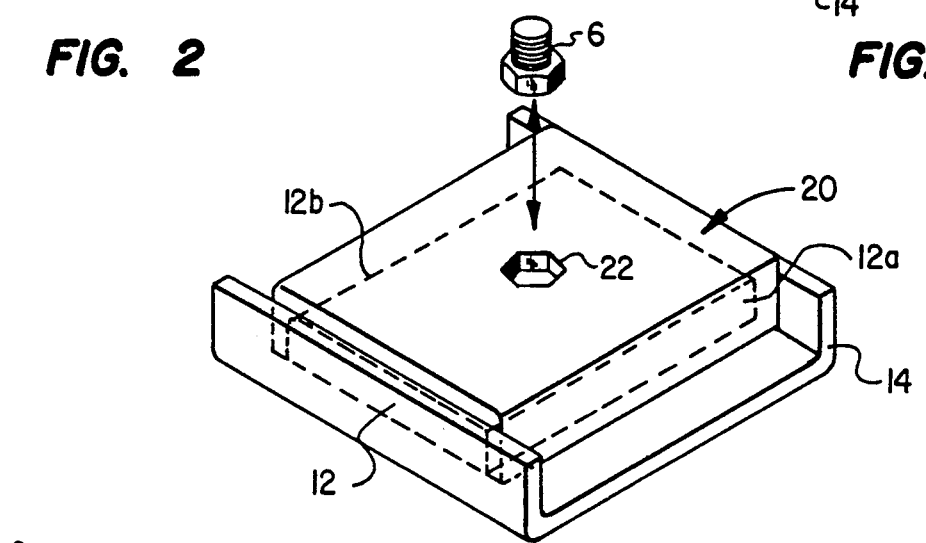
FIG. 4 is a perspective view of an oil plug adapter plate for use with the first or second embodiments of the device.

Referring to FIG. 4, an optional U-shaped adapter plate 20 is shown attached to the second pole surface 12b of the magnet assembly 10. The base 20a of plate 20 has a centrally located hole 22 configured to engage the oil pan plug 6. The plate 20 can have legs or flange portions 20b, 20c to cover the lateral end surfaces 12e, 12f of the magnet 12, respectively. As illustrated, the hole 22 is generally hexagonal to match the shape of the plug head. The hole can be sized to match any shape, metric or English units. A standard plug has a ½" hex head. Metric plugs have head sizes between 14 and 17 mm.

Figure 5:
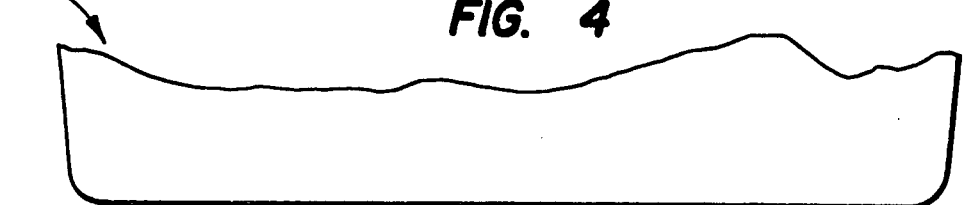
FIG. 5 is a side view of a third embodiment of the external oil pan magnet.

Referring to FIG. 5, another embodiment of the oil pan magnet assembly 30 is disclosed. Said oil pan magnet assembly 30 comprises a generally circular magnet 32 with a central hole 34 dimensioned to engage the oil pan pug 6 and having first and second pole surfaces 32a, 32b, and an outer peripheral surface 32c. The magnet 32 is shielded by a complimentary shield 36 also with a central aperature 38. The shield is configured to cover the first pole surface 32a and the outer peripheral surface 32c of the magnet 32. The aperature 38 can be indented slightly to complement any flange 2a around the oil pan plug 6. The oil pan magnet 30 is placed directly over the oil pan plug 6 in use. In one embodiment for automobiles, the difference between the inner and outer diameters of the circular magnet 32 is approximately 2 inches. The thickness of the magnet is approximately ¼ inch, and the thickness of the shield 36 is approximately ⅝ inches. Of course, as with each embodiment, the present invention can be sized to fit the oil pan and plug used.

When the oil is to be changed, the magnet assembly 30 and plug are turned simultaneously. The plug is magnetized by the magnet. When the plug is removed, any metal debris in the used oil is attached to the plug. The oil is drained and the plug is removed from the magnet assembly and then cleaned of loose debris. The plug is then placed back into the oil pan plug hole and the magnet assembly is replaced on the external surface of the oil pan adjacent to the plug and the oil supply is replenished. This embodiment acts in the same fashion as that disclosed in FIG. 4.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A method of removing metal filings suspended in a fluid in an oil pan, said method comprising:
   (a) coupling a magnet assembly to an external surface of the oil pan;
   (b) removing the fluid from the pan through a sealable hole;
   (c) sliding the magnet across the external surface of the oil pan to a position over the sealable hole; and
   (d) removing the metal filings attracted to the magnet through the sealable hole.

2. A magnet assembly for use in removing metal particles from a fluid in an oil pan, said pan being drainable by removal of a plug, said assembly comprising:
   (a) a rectangular bar magnet with opposed first and second pole surfaces, opposed first and second longitudinal sides, and opposed first and second ends;
   (b) a U-shaped shield having a base coupled to said first pole surface and having legs extending adjacent said first and second sides of said magnet and beyond said second pole surface;

(c) a U-shaped adaptor plate having a base coupled to said second pole surface and having legs covering the first and second ends of said magnet;

wherein both the U-shaped shield and the U-shaped adapter plate are formed of a ferromagnetic steel, and wherein the base of the adaptor plate includes a complementary opening therethrough for engaging a head of the pan plug.

3. A magnet assembly for use in removing metal particles from a fluid in an oil pan, said pan being drainable by removal of a plug, said assembly comprising:

(a) a disc shaped magnet having a central aperture, opposed first and second pole surfaces, and an outer peripheral surface;

(b) a shield formed of ferromagnetic steel configured to cover the first pole surface and the outer peripheral surface of the magnet, the shield having a central aperture and indented portion received in the central aperture of the magnet, the apertures being aligned to receive a shank of the plug, and the indented portion being configured to receive a portion of a head of the plug.

* * * * *